(12) United States Patent
Mossberg et al.

(10) Patent No.: US 7,341,189 B2
(45) Date of Patent: Mar. 11, 2008

(54) SPECTRALLY-ENCODED LABELING AND READING

(75) Inventors: Thomas W. Mossberg, Eugene, OR (US); Christoph M. Greiner, Eugene, OR (US); Dmitri Iazikov, Springfield, OR (US); David S. Alavi, Eugene, OR (US)

(73) Assignee: LightSmyth Technologies Inc, Eugene, OR (US)

( * ) Notice: Subject to any disclaimer, the term of this patent is extended or adjusted under 35 U.S.C. 154(b) by 0 days.

(21) Appl. No.: 11/425,369

(22) Filed: Jun. 20, 2006

(65) Prior Publication Data

US 2006/0219791 A1    Oct. 5, 2006

Related U.S. Application Data

(63) Continuation of application No. 10/704,019, filed on Nov. 4, 2003, now Pat. No. 7,063,260.

(60) Provisional application No. 60/452,010, filed on Mar. 4, 2003, provisional application No. 60/453,115, filed on Mar. 6, 2003.

(51) Int. Cl.
*G06K 7/10* (2006.01)
(52) U.S. Cl. ................... 235/454; 235/462.35
(58) Field of Classification Search ........... 235/462.16, 235/462.08, 454, 462.35, 491, 494
See application file for complete search history.

(56) References Cited

U.S. PATENT DOCUMENTS

| | | | |
|---|---|---|---|
| 3,513,320 A | 5/1970 | Weldon | |
| 3,513,321 A | 5/1970 | Weldon | |
| 3,946,203 A * | 3/1976 | Hecht et al. | 250/271 |
| 4,644,151 A | 2/1987 | Juvinall | |
| 4,658,147 A * | 4/1987 | Eldering | 250/566 |
| 5,534,684 A * | 7/1996 | Danielson | 235/472.02 |
| 5,627,663 A * | 5/1997 | Horan et al. | 359/2 |
| 5,739,131 A | 4/1998 | Yanaka et al. | |
| 5,757,521 A | 5/1998 | Walters et al. | |
| 5,761,219 A | 6/1998 | Maltsev | |
| 6,296,189 B1 | 10/2001 | Lawandy et al. | |
| 6,318,631 B1 * | 11/2001 | Halperin | 235/383 |
| 6,473,165 B1 * | 10/2002 | Coombs et al. | 356/71 |
| 2003/0006170 A1 * | 1/2003 | Lawandy | 209/3.3 |
| 2003/0012562 A1 * | 1/2003 | Lawandy et al. | 386/126 |
| 2003/0062422 A1 | 4/2003 | Fateley et al. | |

* cited by examiner

*Primary Examiner*—Michael G. Lee
*Assistant Examiner*—Paultep Savusdiphol
(74) *Attorney, Agent, or Firm*—David S. Alavi

(57) ABSTRACT

A spectrally-encoded label comprises a spectrally-selective optical element having a label spectral signature. The label spectral signature is determined according to a spectral-encoding scheme so as to represent predetermined label information within the spectral encoding scheme. The label emits output light in response to input light selected by the label spectral signature of the optical element. A spectrally-encoded label system further comprises an optical detector sensitive to the output light emitted from the label, and a decoder operatively coupled to the detector for extracting the label information according to the spectral encoding scheme, and may also include a light source providing the input light for illuminating the label.

44 Claims, 12 Drawing Sheets

SPECTRALLY-ENCODED LABELING AND READING

BENEFIT CLAIMS TO RELATED APPLICATIONS

This application is a continuation of U.S. non-provisional App. No. 10/704,019 filed Nov. 4, 2003 (now U.S. Pat. No. 7,063,260), which claims benefit of U.S. provisional App. No. 60/452,010 filed Mar. 4, 2003 and U.S. provisional App. No. 60/453,115 filed Mar. 6, 2003. Each of said non-provisional and provisional applications is hereby incorporated by reference as if fully set forth herein.

BACKGROUND

The field of the present invention relates to optically encoded labels and label systems. In particular, spectrally-encoded labels and label systems are disclosed herein.

The identification of objects via mechanical, electronic, and optical means rather than direct visual inspection is an important function. The familiar spatial bar codes that are imprinted on many packaged products, for example, allow opto-mechanical-electronic readers/scanners to identify products while rapidly forwarding identification information to inventory computers or other record keeping devices. Bar codes are typically read by a spatially scanning laser beam which passes successively across a series of lines of various thicknesses. An optical detector receptive to light scattered or transmitted by the label sees a series of temporal changes in the light level and acts to convert the temporally varying optical signal to an electronic facsimile comprising temporally modulated voltage or current. Identification information is extracted electronically from the temporally structured electronic signal.

In order for a spatial bar coding system to function, it is necessary that the scanning optical beam, typically a laser beam, be of a suitably small diameter where it strikes the bar code so as to be capable of serially illuminating the label's constituent spatial elements. If the beam diameter is too large, the temporal structure of the scattered or transmitted optical signal will be washed out. The more distant a label is relative to a scanning device, the more difficult it becomes to ensure that the scanning optical beam will have a sufficiently small diameter to adequately resolve spatial structure encoded on the label.

SUMMARY

A spectrally-encoded label comprises a spectrally-selective optical element having a label spectral signature. The label spectral signature is determined according to a spectral-encoding scheme so as to represent predetermined label information within the spectral encoding scheme. The label emits output light in response to input light selected by the label spectral signature of the optical element. A spectrally-encoded label system further comprises an optical detector sensitive to the output light emitted from the label, and a decoder operatively coupled to the detector for extracting the label information according to the spectral encoding scheme, and may also include a light source providing the input light for illuminating the label.

Objects and advantages pertaining to spectrally-encoded labels and label systems may become apparent upon referring to the exemplary embodiments as illustrated in the drawings and/or disclosed in the following written description and/or claims.

The embodiments shown in the Figures are exemplary, and should not be construed as limiting the scope of the present disclosure and/or appended claims.

DETAILED DESCRIPTION OF EMBODIMENTS

Figure 1:
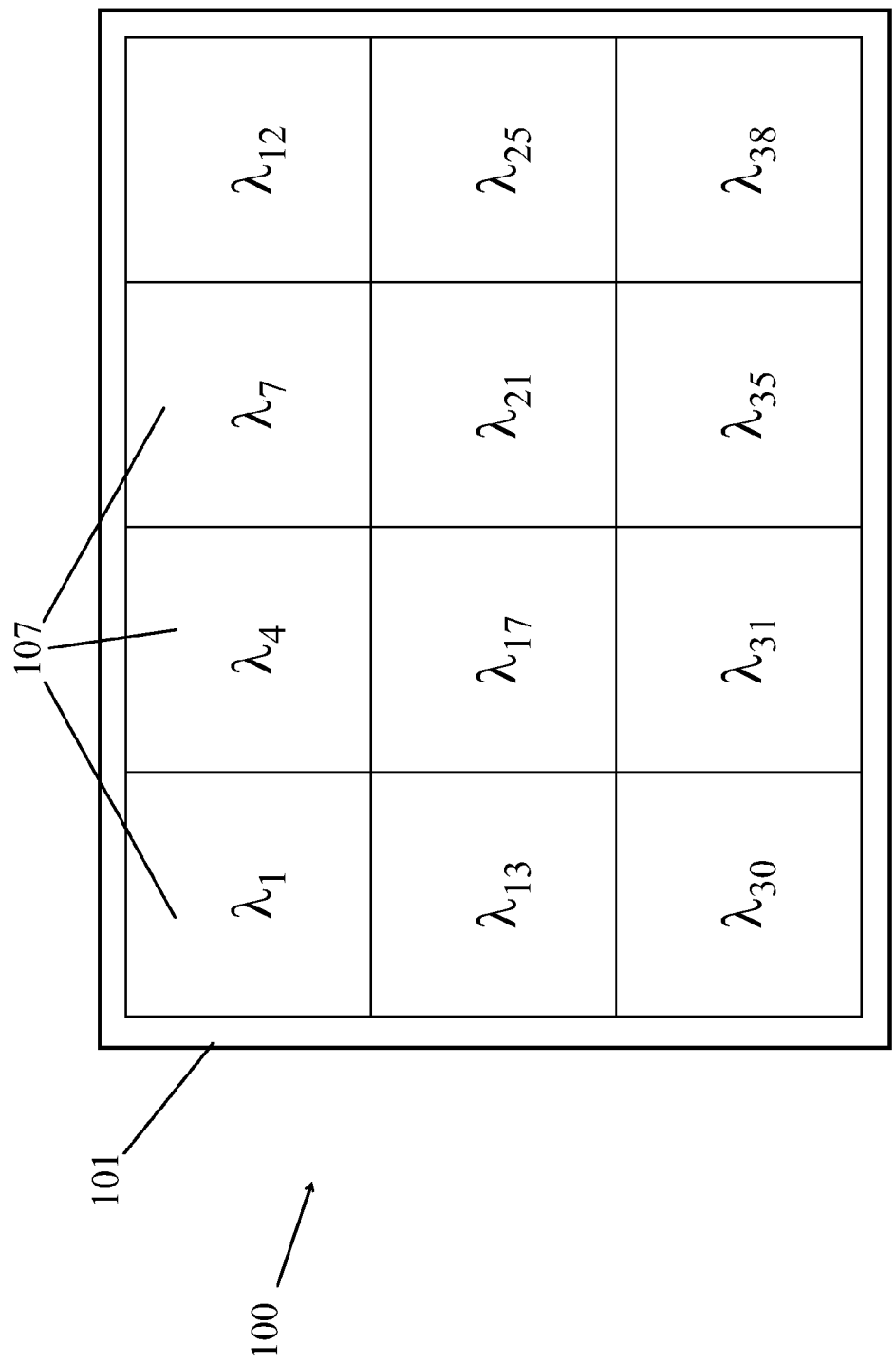
FIG. 1 illustrates schematically a spectrally-encoded label.

Optical signals can be encoded spectrally as well as spatially. In FIG. 1, a spectral label 100 is shown divided into multiple spatial regions 107 (i.e., label areal segments). Each label area is configured (by incorporation of a suitable spectrally-selective optical element or portion thereof) to emit output light in response to input light within an areal spectral signature. In a simple example, each spatial region is configured to backscatter light within a single spectral band. In other cases, each spatial region may be configured to backscatter over a certain set of spectral bands with each constituent band having controlled relative backscatter amplitude. Such exemplary labels may be provided with a unique label spectral signature, which includes contributions from the areal spectral signatures, by varying one or more of the following attributes of the label: the number of spectral bands, the nominal center wavelengths of the spectral bands, the relative amplitudes and/or relative spectral widths of the backscattered spectral bands, and/or the relative spectral separations of the backscattered spectral bands. The set of chosen spectral bands and the relative configuration of those bands (i.e., the label spectral signature) backscattered or otherwise emitted by a spectral label comprises the label's information content. The label spectral signature shown in FIG. 1 is exemplary; any other set of spectral bands may be chosen to produce a label spectral signature for spectrally-encoding corresponding label information within a given spectral encoding scheme. For purposes of enhancing backscatter and/or to provide structural stability, the elements employed to implement spectrally controlled backscatter may be mounted on an underlayer 101.

The label areas may be configured to backscatter or back reflect (i.e., emit) output light of a chosen label spectral signature using a variety of means, including but not limited to use of dielectric thin film filters and/or gratings as spectrally-selective optical elements. If dielectric thin film filters are employed in the design of the spectral label, the filters may be designed to transmit light according to the desired label spectral signature. Input light will then pass through the filter, strike a reflecting or scattering underlayer, and return through the filter for collection and detection (for example, back toward a source of input light such as a reading optical beam). In situations where wavelength-dependent transmissive optical filters are employed to define the label spectral signature, it is desirable to use an underlayer having reflectivity or scattering strength that is reasonably invariant over the label spectral signature. Furthermore, it may be desirable for the underlayer to be directional in its reflectivity or scattering, so as to concentrate light in the backscattered direction, i.e. strongly retro-reflective. Suitable underlayers include reflective films with molded corner-cubes or related structures known in the art to provide highly directional back reflection. The underlayer may also comprise discrete mirrors or other focusing elements utilized to collimate or otherwise control the character of backscattered or back reflected light. Wavelength-dependent dielectric thin film filters operating in a reflective mode can also be employed in the spectral label. In some cases a diffusive overlayer or surface roughening or other similar adaptation over reflective filters may be advantageous for avoiding specular reflection; specular reflection may be advantageous in other cases. Aside from dielectric thin film devices, the backscattering spectrum of the label (or areal segments thereof) can be controlled using absorptive or interferometric filters passing only certain designed spectral bands, which are backscattered or back reflected by an underlayer. Interferometric structures directly overlaid on a strongly backscattering or back reflecting substrate may also serve as a spectrally-encoded label.

Figure 2:
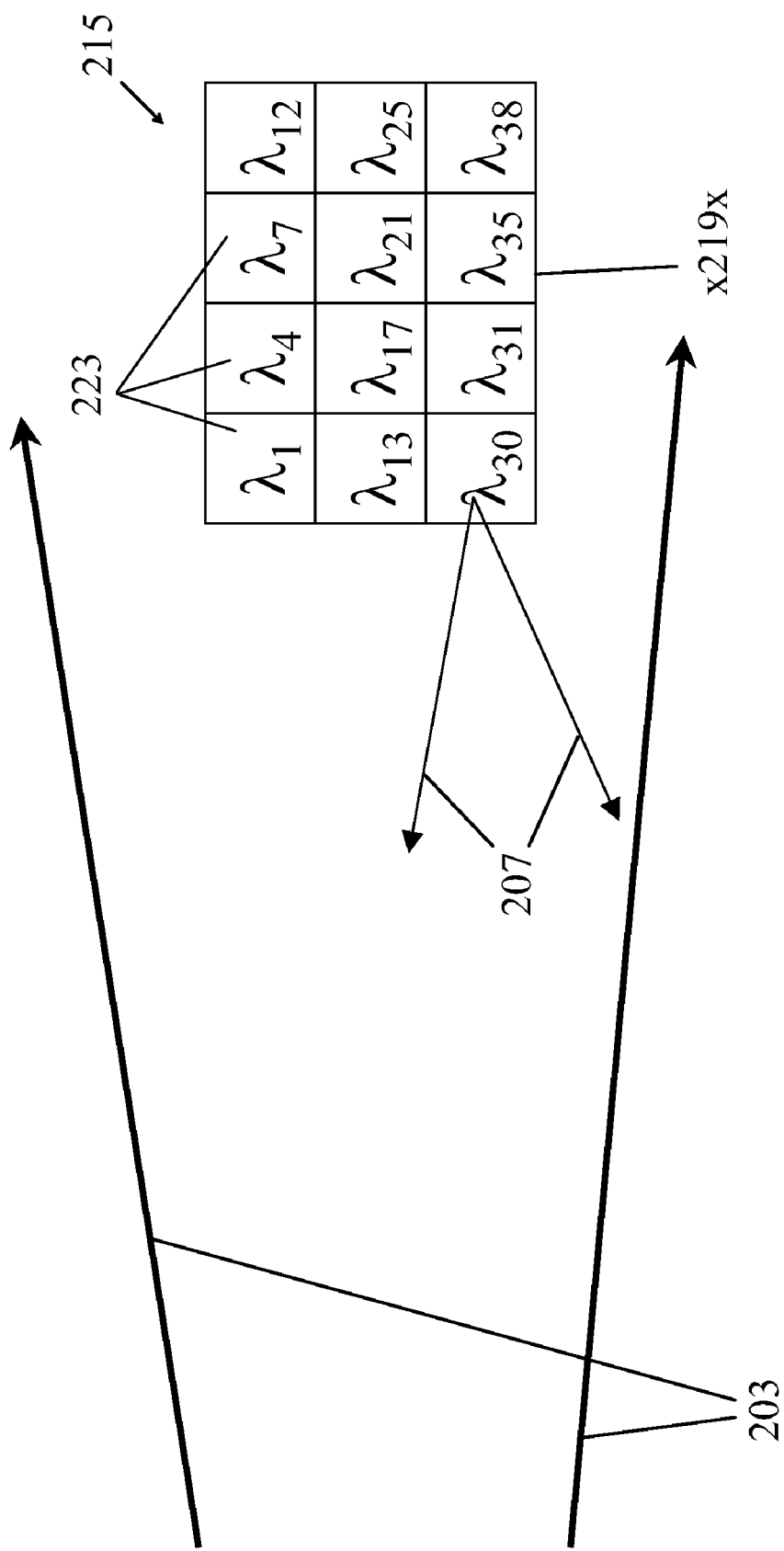
FIG. 2 illustrates schematically illumination of and emission from a spectrally-encoded label.

In FIG. 2 is shown a spectral label 215 illuminated by an input reading optical beam 203. The reading beam illuminates all areal segments 223 on the label. If the reading optical beam has a sufficiently broad spectral bandwidth (i.e., spans the spectral signature of the label 215), the spectral label will backscatter light at each of the spectral bands comprising its spectral signature. Each areal segment 223 may emit output light of a corresponding areal spectral signature, which may comprise a single spectral band or multiple spectral bands of the label spectral signature. A device for reading the spectrally-encoded label, which accepts a portion of the output light emitted from the label, may be positioned anywhere in the backscatter cone 207 of the label. In other words, spatial separation of reading beam and label signal detector is permissible provided that the detector is located within the region of backscattered or back reflected output light. A portion of the output light from the label will reach an optical detector (typically, but not necessarily, near the source of the reading beam), where it is detected and analyzed by a decoder for extracting the spectrally-encoded label information. In the case of a spectrally broad reading optical beam, the spectral label reader includes a spectrally-resolved detector (a spectrometer, optical spectrum analyzer, or other such device) that may collect the label spectral signature (by scanning or by multi-channel detection). The spectral resolution of the detector is sufficient to resolve the label spectral signature. Signal output from the spectrally-resolved optical receiver may comprise a temporal waveform representing the label spectral signature.

If the reading beam comprises input light having a spectral bandwidth sufficiently narrow to resolve the label spectral signature, light will only be emitted by the label when the input light is selected by the label spectral signature. When the spectrally narrow reading beam illuminates the entire spectral label (i.e., all label areal segments) and is scanned in frequency across the label spectral profile, the decoder receives a time varying optical signal such that the information contained in the spectral label is manifest in the time-dependent intensity profile of the backscattered or back reflected signal. Thus either spectrally broad or spectrally narrow optical reading beams (i.e., input light) may be employed to read spectrally-encoded labels. In the former case, a spectrally-resolved receiver (scanned or multi-channel) produces a temporal signal representative of the label spectral signature (i.e., spectrally-encoded label information). In the latter case, a spectrally-resolved reading beam is scanned in wavelength to produce a temporal signal representative of the spectrally-encoded label information.

Figure 3:
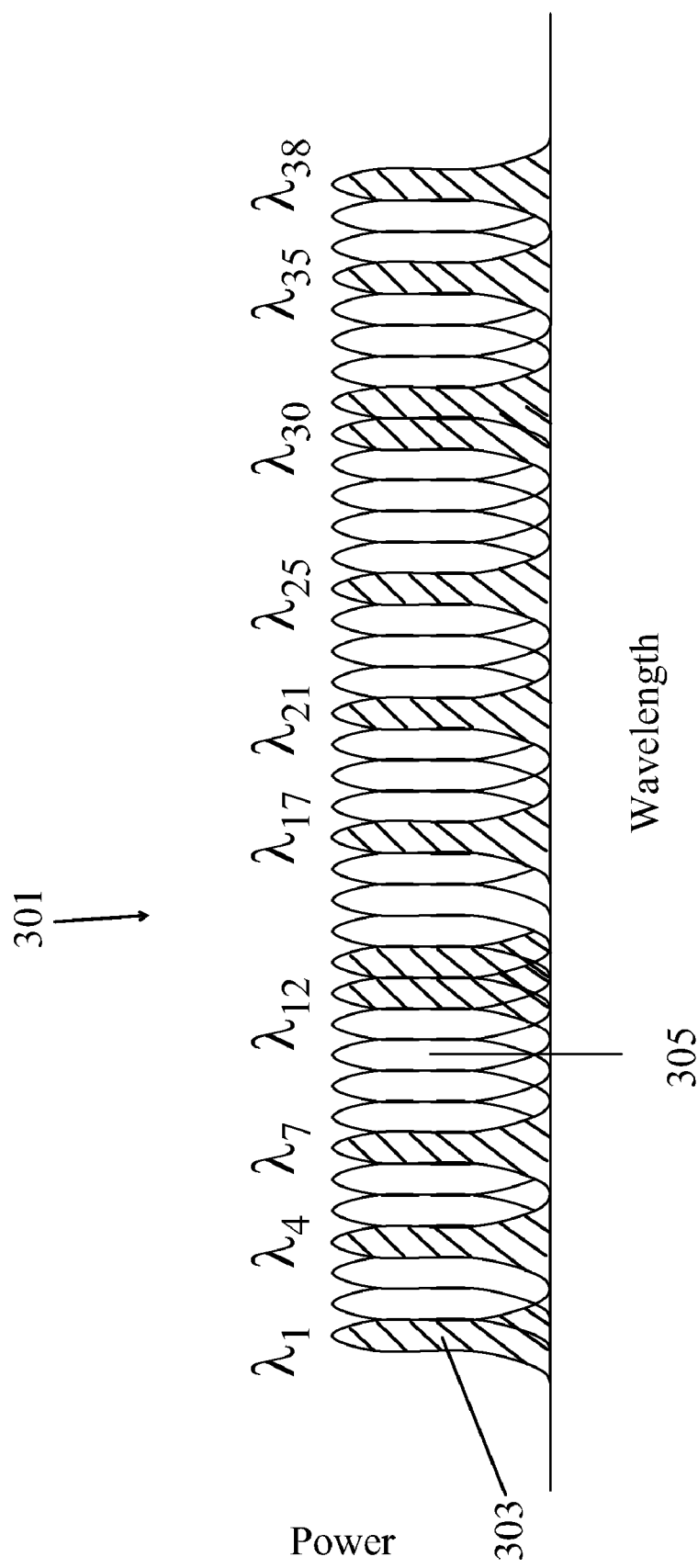
FIG. 3 illustrates chosen and non-chosen spectral bands of a spectrally-encoded label.

In FIG. 3 is depicted a representative label spectral signature 301 produced by the spectral label shown in FIGS. 1 and 2 in the case where each label area emits a single distinct spectral band. In the spectral signature format (i.e., spectral encoding scheme) shown in FIG. 3, 38 adjacent spectral bands are defined. A single spectral label, like that shown in FIG. 1, backscatters up to 12 of the spectral bands, thereby providing for several billion distinct label spectral signatures. In this exemplary case, each spectral channel has essentially the same width and the channels collectively span a continuous frequency range. The cross-hatched peaks 303 represent spectral channels emitted (backscattered, back reflected, or otherwise) while the white peaks 305 represent available spectral channels not used in the particular label spectral signature represented in FIG. 1. In this example all of the areal spectral signatures present in the label contribute to the label spectral signature.

Figure 4:
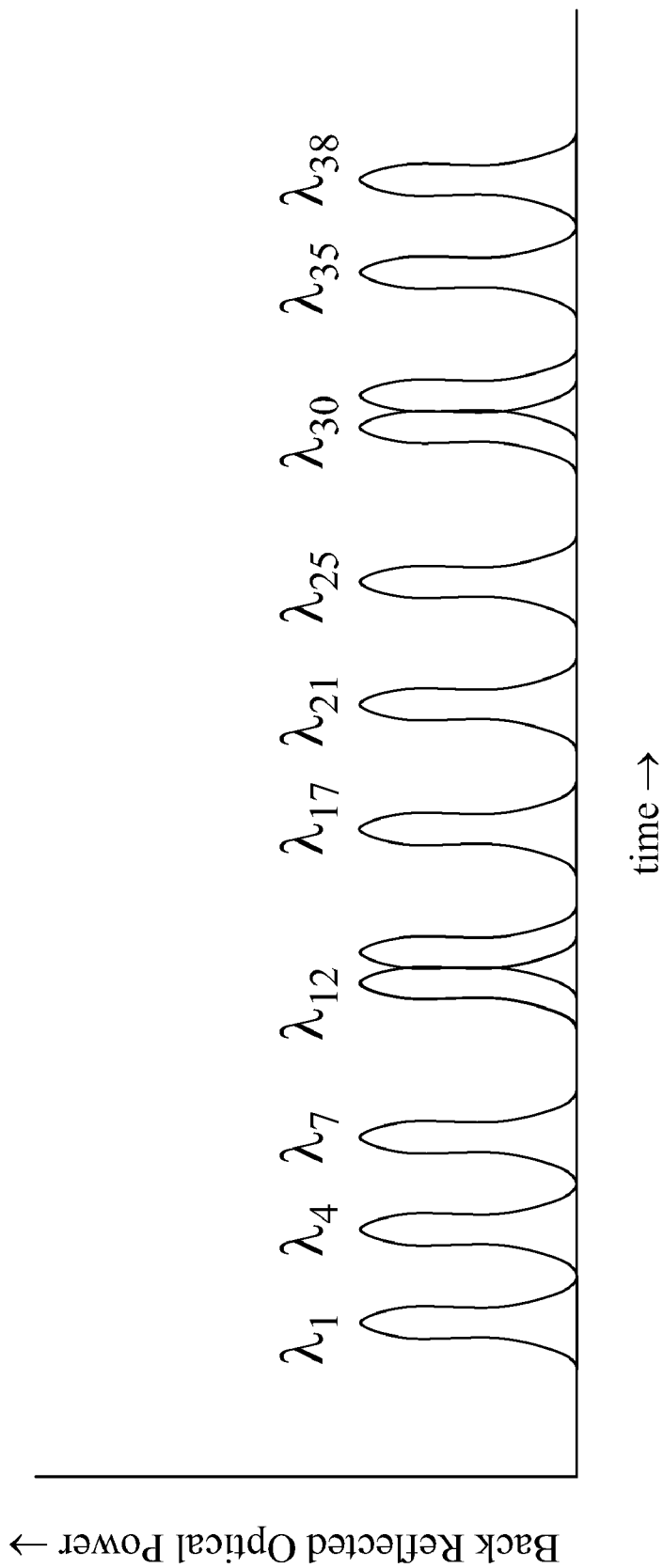
FIG. 4 illustrates a temporal waveform arising from reading a spectrally-encoded label.

FIG. 4 may represent the temporal waveform produced by detecting light backscattered from spectrally narrowband (narrower than the narrowest feature of the label spectral signature) reading beam as it is wavelength-scanned across the spectral label of FIG. 1. Alternatively, FIG. 4 may represent the temporal waveform of a spectrometer (with resolution sufficient to resolve the narrowest spectral label feature) scanned across the spectrum of label backscatter generated by a broad bandwidth reading beam. The temporal waveform derived from scanning (i.e. reading) the label spectrum as depicted schematically in FIG. 4 contains the unique label information and is decoded for extracting the label information. This might be done in a manner similar to decoding of spatial bar code signal, and a spectral encoding scheme might be contrived in a manner completely analogous to spatial bar-coding schemes. Barcoding schemes or protocols already recognized for encoding information in spatial barcodes may be directly implemented for analogously encoding information in spectrally-encoded labels. It should be noted that the label signature temporal waveform shown in FIG. 4 does not change substantially in form when the emitted wavelengths are shifted together to either higher or lower optical frequency. This invariance facilitates use of thin film filters in the spectral label as the spectrally-selective element, since transmissive/reflective spectral features of such thin film structures tend to shift as a function of input angle of incidence. As long as all thin film filters are constructed so as to have an substantially similar angular tuning rate and the reading process encompasses a suitably wide wavelength range, the temporal waveform of FIG. 4 (and therefore the label information extracted therefrom) is substantially unchanged as one varies the incidence angle (hence the term "nominal center wavelength": the actual center wavelengths of emitted spectral bands may vary in some cases without substantially changing the encoded label information). Grating-based spectrally selective elements, like thin film filters, tend to exhibit a spectral shift that is nearly the same for all backscattered wavelengths as one changes the reading angle, and are therefore also readable at varying incidence angles.

In other implementations of a spectrally-encoded label system, encoded label information may be extracted directly from the detected spectrum, without conversion into a temporal waveform. This may be accomplished in any suitable manner using any suitable hardware, software, algorithm, and so on, and may be done based on relative wavelength or absolute wavelength. In the former case, spectrally-selective elements with angle-dependent spectral properties may be used (as described hereinabove). In the latter case, such angle-dependent elements could only be used if the incidence angle is known and substantially fixed. Substantially angle-independent spectrally-selective elements (such as absorptive-type filters) may be employed at varying incidence angles for spectral encoding schemes that rely on absolute wavelength determination.

Figure 5A:
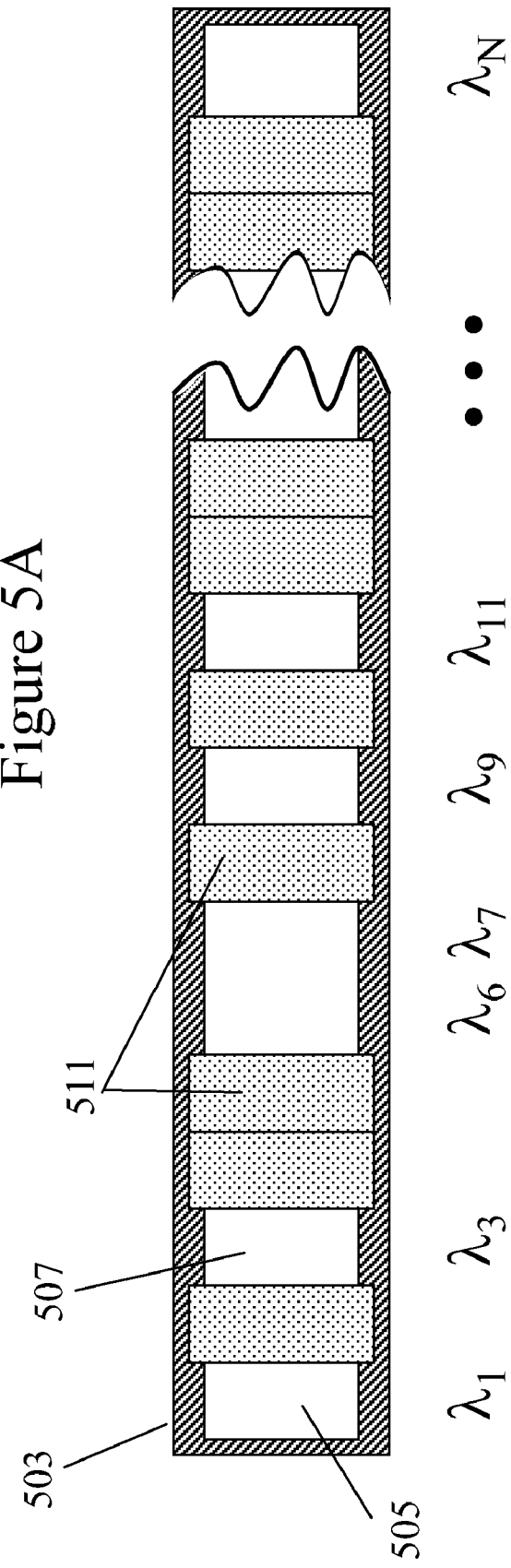
FIGS. 5A and 5B illustrate schematically a spectrally-encoded label.
Figure 5B:
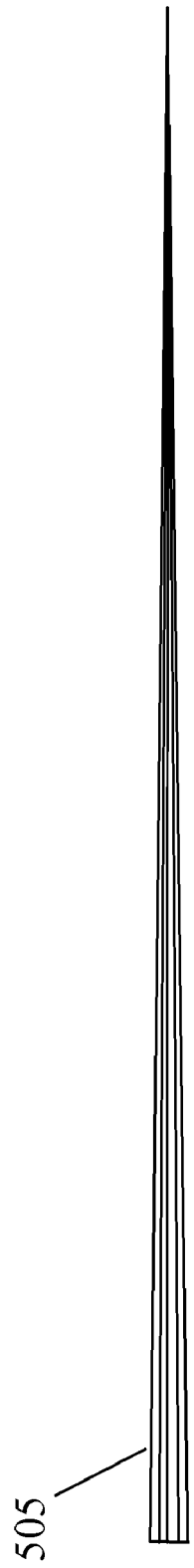

In the example of FIGS. 1 and 2, label areas are present for only those areal spectral signatures that contribute to the label spectral signature. FIGS. 5A and 5B illustrate a different exemplary embodiment of a spectrally-encoded label in which areal segments of the spectrally-selective element are present for all areal profiles that might be employed for encoding information according to the given spectral encoding scheme. A thin film filter 505 is formed on a reflective or scattering underlayer 503, with the layer thicknesses of filter 505 varying as a function of position along the long label dimension (as shown in the schematic side view of thin film filter 505 of FIG. 5B). A thin film filter with such a thickness gradient (i.e., a gradient filter) has a transmission (or reflection) band that shifts in wavelength (and also possibly bandwidth) as a function of position along the filter. Such thin film filters with bandwidths as narrow as 50 GHz or less have been developed for the optical communications industry. Gradient thin film filters with local bandpass function of this width support spectral labels having a 100 spectral channels spanning a 40-50 nm spectral window in the spectral vicinity of 1.5 micrometers. Large numbers of identical gradient filters may be mass produced at low cost to provide spectral label stock. A particular spectral label is conveniently produced by applying overlayers 511 (comprising for example paint, ink, tape, or other opaque material) to mask off portions of the gradient filter, thereby deactivating those areas of the spectral label. The exposed portions 507 of filter 505 form the active label areas, and their widths and positions along the length of filter 505 define the spectral signature of a particular spectrally-encoded label. Use of gradient thin film filters provides a powerful pathway to low cost yet high performance spectral labels.

Figures 6A, 6B:
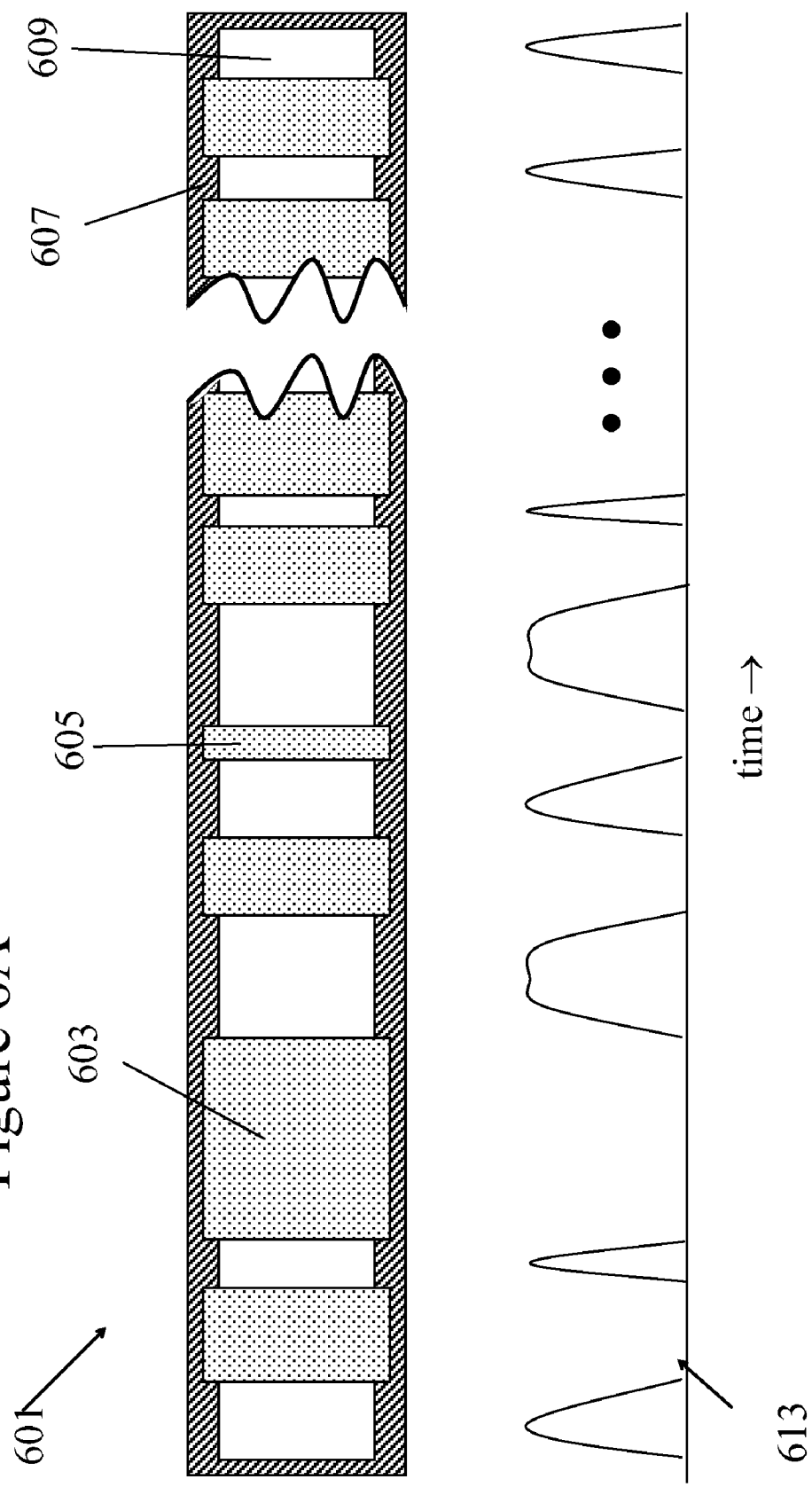
FIGS. 6A and 6B illustrate schematically a spectrally-encoded label.

FIG. 6A depicts a gradient-thin-film-filter-based spectral label 601 comprising a gradient thin film filter 609 on an emitting (scattering or reflecting or otherwise) underlayer 607. The nominal spectral bands of the active label areas have unequal widths in this example. Chosen nominal spectral bands of the spectral label are controlled by adjusting the widths and positions of the masking overlayers (such as 603 and 605). The mask elements may be formed in any suitable manner. For example, the mask elements may be readily formed using standard barcoding techniques (on a transparent label applied over the gradient thin film filter, applied/printed directly on the gradient thin film filter, and so on). Reading of the filter may be performed as described hereinabove, and if a temporal waveform is generated from the spectral label it may resemble the waveform of FIG. 6B. The temporal waveform may be decoded by any suitable means, including those employed for standard barcode reading and decoding. Employing standard barcodes for masking a gradient thin film filter in this manner enables use of previously developed techniques, equipment, methodologies, and standards developed for encoding, forming, and decoding spatial barcode labels for encoding, forming, and decoding spectral labels. The constraint that the reading beam be sufficiently small relative to the spatial widths of the spatial barcode label would not apply to the spectrally encoded label. The size constraint relevant to the spectrally encoded label is that the spectral resolution (either illumination or detection) is smaller than the narrowest spectral feature of the label, which in the example of FIGS. 5A, 5B, and 6A is in turn determined by the smallest width of the mask segments and the magnitude of the spectral gradient. These parameters may be varied for enabling a wider range of reading conditions than is possible for reading spatial barcodes.

Instead of masking segments of the gradient thin film filter for deactivating them, such segments may instead by structurally altered in some way for deactivation. For example, segments may be deactivated by ablation, etching, annealing, or other process that renders them non-transmissive, non-reflecting, or otherwise prevents emission of output light in response to input light. Alternatively, the masking segments may be applied beneath the gradient filter to block backscattering or back reflection from the underlayer. Rather than applying masking segments over the underlayer, the underlayer itself may be applied in segments so as to define the label spectral signature.

Figure 7:
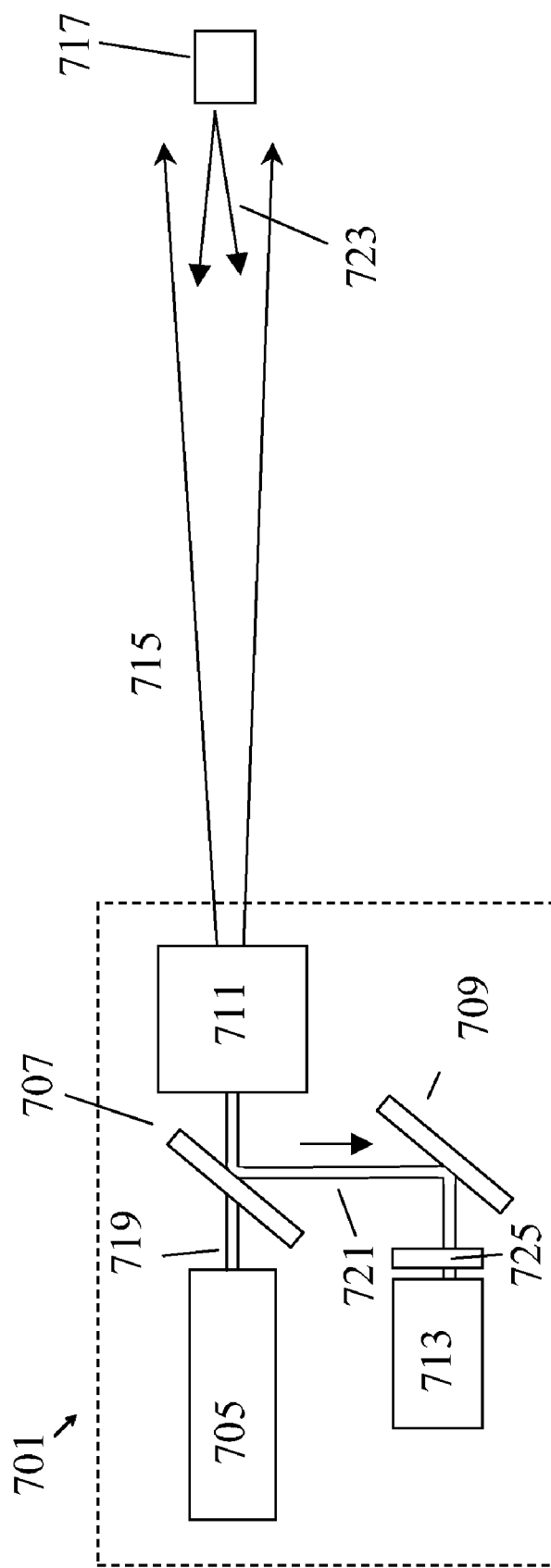
FIG. 7 illustrates schematically a reader for a spectrally-encoded label.

FIG. 7 depicts a spectral label reader 701 employing a spectrally narrow reading beam source and broadband detection. In this case the reading beam may be generated by a semiconductor diode laser 705 whose output spectral bandwidth is comparable or narrower than the narrowest feature of the spectral signature of the target spectral label 717. The reading beam source must be tunable over the full spectral extent of the spectral signature of the target spectral label, including spectral shifts that may be anticipated when the label is to be read from all desired directions. It is not necessary that the reading beam scan continuously; mode hops or other spectral discontinuities smaller that the widths of the label's spectral bands are acceptable. If the source is a laser it may be wavelength-scanned by control over an excitation parameter such as current, or by temperature, or by electro-optic, piezoelectric, or mechanical tuning of an external cavity. Any other tuning means known in the art will serve equally well provided tuning bandwidth covers the label spectral bands. Other sources could include a fiber laser, a spectrally-filtered LED, or any other light source known in the art to have sufficiently narrow and tunable output either directly or by virtue of an add-on spectral filtering device. Spectral scanning may occur over any suitable time interval, with full range scans (i.e., over the entire spectral signature of a spectral label) preferably requiring less than about a minute, more preferably less than about a second or even less than about 10 msec. The wavelength range over which the spectral label is encoded may reside in the ultraviolet, visible, or infrared portions of the optical spectrum.

In the exemplary reader embodiment 701 of FIG. 7, beam 719 generated by laser 705 passes through a beam splitter 707 and through a beam collimator 711, generating the reading beam 715 having a divergence sufficient to ensure that the reading beam illuminates the entire spectral label at the desired reading distance. The beam collimator 711 may be adjustable so that reading spot size can be varied to suit variable label sizes and reading distances. Optimal backscatter power will ensue when the reading beam width at the location of the spectral label is comparable to the width of the label itself; however, ease of targeting a particular label will be enhanced using reading beams of somewhat larger divergence—provided that multiple labels do not fall within the resultant beam width. When illuminated by the reading beam 715, the spectral label 717 generates an emitted output signal 723 (scattered, reflected, or otherwise) in response to input light selected by the label spectral signature. Optimum label output signal size is achieved by minimizing the divergence angle of the emitted output signal. With a corner-cube based retro-reflective underlayer, back reflected divergence may be limited to a few degrees or less. If reading devices are to operate at locations separated from the reading beam source, larger output signal divergence may be useful. Label output signals are collected in this example by beam collimator 711 and directed as beam 721 via beam-splitter 707 and mirror 709 to an optical detector 713. With a narrow bandwidth reading beam, the optical detector does not require narrow bandwidth selectivity. It may be advantageous under some circumstances to place a bandpass filter 725, which transmits all optical wavelengths potentially emitted by label 717 while substantially blocking other wavelengths, in front of the optical detector to eliminate background signal from ambient sources. The electronic output signal from the optical detector 713 may comprise a temporal waveform whose structure represents the spectral label information content. The such as temporal waveform from detector 713 may be decoded electronically using means known in the art for such decoding, including such means as are employed in the decoding of spatial barcodes. The detected output signal spectrum may instead be analyzed directly for decoding the label.

Depending on the power available in the reading beam, the reading beam divergence, the backscatter or back reflecting efficiency of the spectral label, the backscatter or back reflecting divergence, and ambient optical noise levels, it should be possible to read spectral labels at distances up to the kilometer scale. For illustration, with reading beam and backscatter divergences at about $\theta_R \approx 2$ mrad and $\theta_B \approx 60$ mrad, respectively, label and collimator apertures, $A_L$ and $A_C$, respectively, at about 10 cm$^2$, and at a range of L$\approx$1 km, the reading device will collect approximately $10^{-10}$ of the total radiated reading beam power assuming near unity backscattering efficiency, R, of the spectral label. A 1-watt reading beam will thus return approximately 100 picowatts of signal from the spectral label for detection and decoding. Detection means known in the art are capable of detecting signals at that power level on time scales of a second or less. The detected backscatter signal scales as $P_O A_L A_C R / L^4 \theta_R^2 \theta_B^2$, where $P_O$ is the reading beam launch power.

Figure 12:
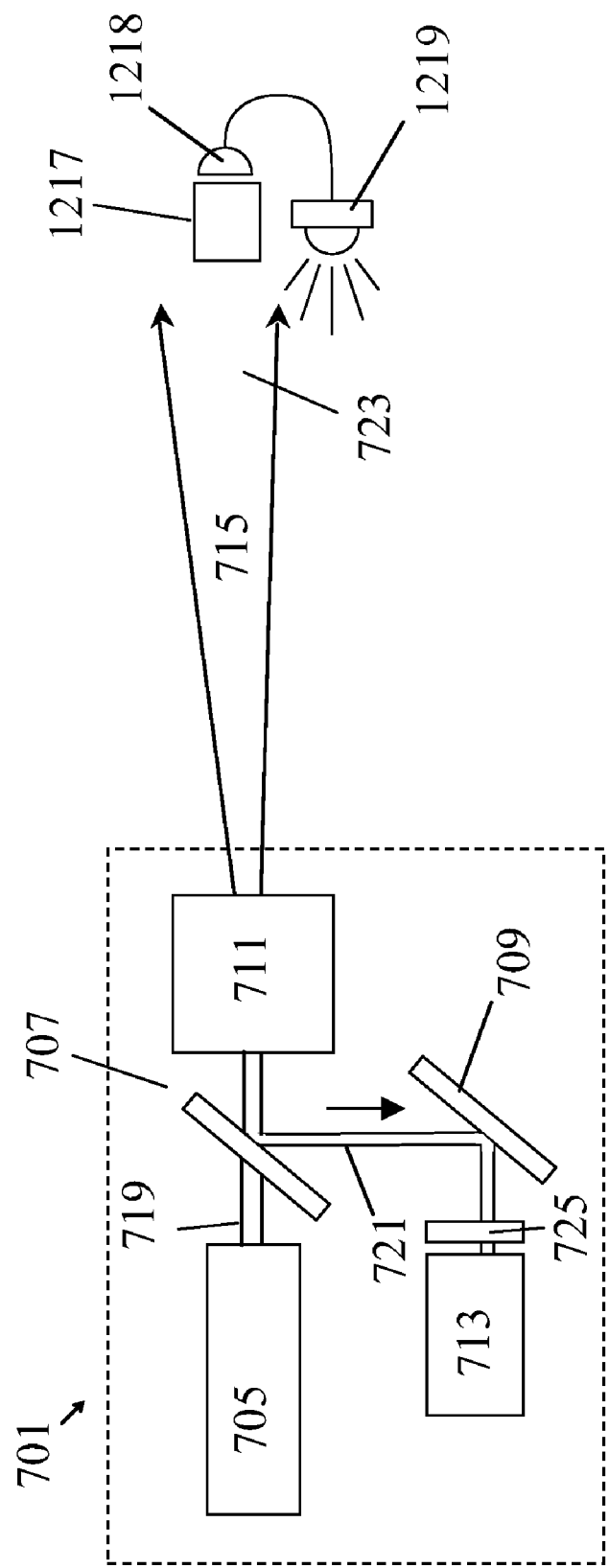
FIG. 12 illustrates schematically a spectrally-encoded label.

FIG. 12 illustrates a variant which may increase the distance over which a spectrally-encoded label may be read. Instead of returning a portion of the input light to the reader for detection, the label 1217 may include one or more optical detectors 1218. Detector(s) 1218 may be positioned for detecting portions of input light transmitted through wavelength dependent transmissive optical elements of label 1217, for example, so that as the wavelength of the input beam is scanned, each detector 1218 generates a time-dependent electronic output signal. Label 1217 further comprises one or more light sources 1219 connected to detectors 1218, so that the light sources emit output light in response to detected input light. Output light arising from the light source(s) 1219 as the wavelength of the reading beam is scanned is detected by detector 713, thereby generating a temporal waveform corresponding to the label information encoded in the label spectral signature of label 1217. The output light intensity reaching detector 713 from light source(s) 1219 may be considerably larger than that of back scattered or back reflected input light (as in FIG. 7), thereby increasing the distance from which the spectrally-encoded label may be read. Any suitable optical detector(s) may be employed as detector 1218, provided they are sufficiently fast to resolve the spectral signature of the label 1217 at the scan rate of the reading beam. Similarly, any light source may be employed for source(s) 1219, provided they are sufficiently fast to resolve the spectral signature of the label 1217 at the scan rate of the reading beam. One or more LEDs may be employed for light source(s) 1219, for example. It may be desirable, in order to reduce triggering of light source(s) 1219 by relatively constant ambient light, to employed high pass filtering of photodetector signal(s). Such filtering may pass signals generated by rapid scanning of a reading beam but block signals characteristic of a more constant ambient background. In addition, since ambient light may be relatively broadband, it can be discriminated against by operating detector(s) 1218 (or follow-on electronic processing) in differential rather than direct mode.

Figure 8:
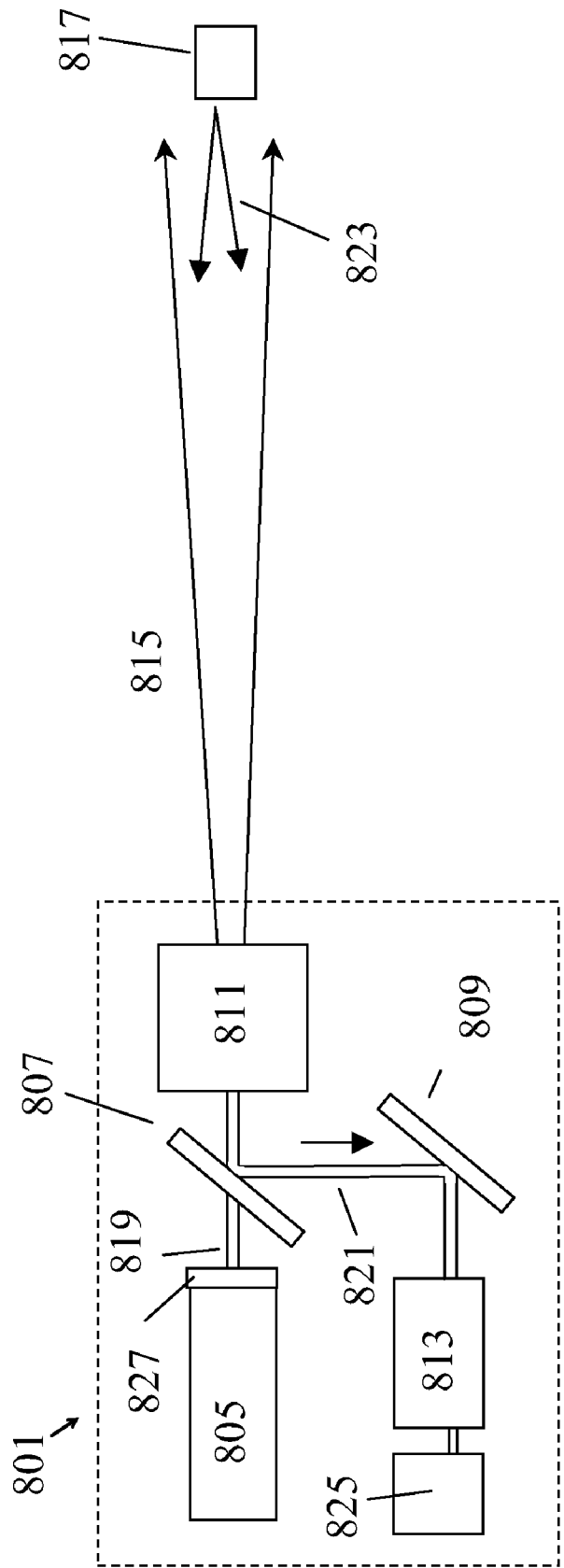
FIG. 8 illustrates schematically a reader for a spectrally-encoded label.

FIG. 8 depicts a reading device 801 incorporating a broadband reading beam source 805 and spectrally-resolved detection. The broadband source may be an LED, a superfluorescent diode, an amplified spontaneous emission source such as an erbium-doped-fiber amplifier, a lamp (such as an incandescent lamp, an arc lamp, a fluorescent lamp, a discharge lamp, and so forth) or other source known in the art to provide an emission bandwidth spanning the spectral label signature (including wavelength shifts due to varying incidence angles on the label). The broadband source may be followed (if needed or desired) by a spectral shaping filter 827 that eliminates any unneeded components of the source bandwidth. The light source beam 819 passes through a beam splitter 807 and into a beam collimator 811. The beam collimator may function, as in the case of FIG. 7, to more closely match the reading beam width at the spectral label to the dimensions of the label, consistent with convenient targeting of the spectral label and intrinsic source divergence. The reading beam 815 is aimed to illuminate the entire spectral label 817 and produce emitted output light 823 (by scattering, reflecting, or otherwise). Some of the output light from label 817 returns to the reading device 801 through collimator 811 and is directed by beam splitter 807 and mirror 809 to a narrow bandwidth tunable filter 813. The spectral pass band of the tunable filter is scanned across the label spectral bands and passes the spectrally selected optical signal to an optical detector 825. Instead of a tunable filter, a grating- or prism-based scanning spectrometer may be employed. Instead of a scanning wavelength selector, a grating, prism, or other dispersive element may be employed to angularly disperse the emitted output signal onto a detector array for simultaneous recording of all of the label spectral bands (also referred to as multi-channel detection). In any of these cases employing a broadband source and spectrally-resolved detection, the signal from the label may be converted into a temporal waveform for decoding (as described hereinabove) or the detected spectrum may be analyzed directly for decoding.

There are many variations possible using approaches known in the art to implementing the details of the optical source (broadband or tunable narrowband), filtering elements used in the spectral label, spectral label format, detector (broadband or spectrally-resolved), and decoder. Such variations fall within the scope of the present disclosure and/or appended claims.

Figure 9:
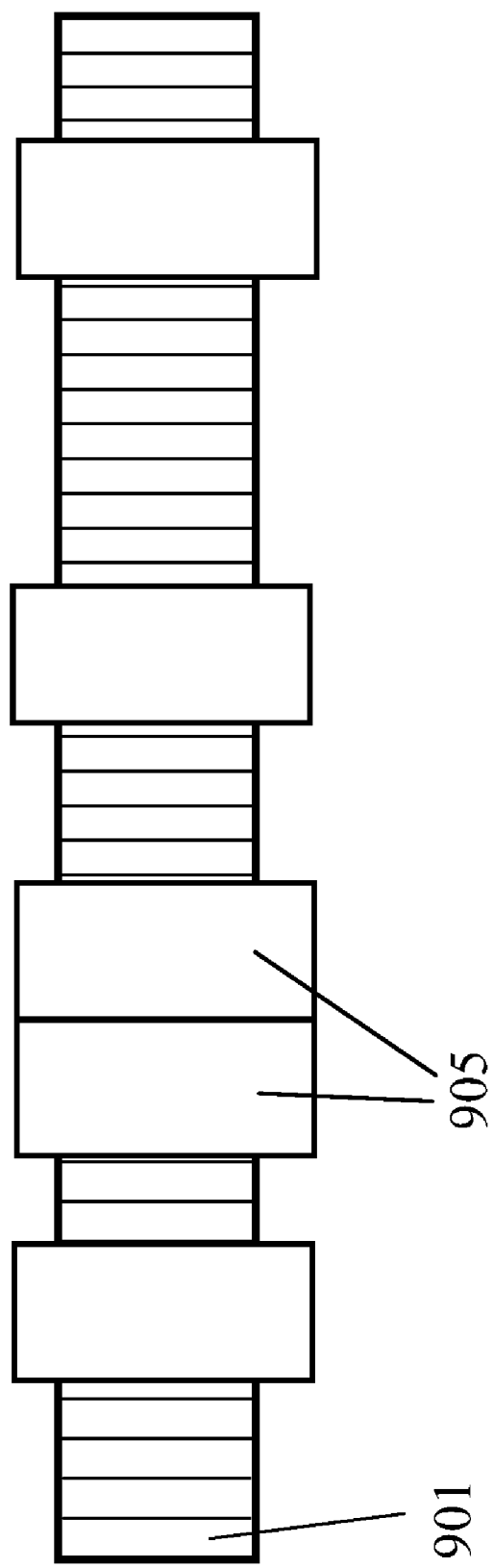
FIG. 9 illustrates schematically a spectrally-encoded label.

An alternative embodiment of a spectral label may be employed when labels are to be read from a specific non-zero angle of incidence. In this scenario a chirped spatial diffraction grating 901 is employed (FIG. 9; "chirped" designating a grating wherein the groove or line density varies along the grating). The chirped grating may be stamped, imprinted, or otherwise fabricated on a suitable substrate including plastic, glass, metal, or other reflective material. A reading beam will generate Littrow back-diffraction from the chirped grating at wavelength-dependent positions along the chirped grating. As a spectrally narrow reading beam is scanned in wavelength, or as a spectrally-resolved detector is scanned, the portion of the grating 901 that provides Littrow back-diffraction moves along the chirped grating. By matching the scan range to the chirp bandwidth of the grating and considering the viewing angle, the portion of the grating providing Littrow back-diffraction may be made to scan from one end of the chirped grating to the other. Fabrication of the chirped grating by stamping into plastic labels provides for an economical spectral label format. The spectral code can be applied, as in the case of a gradient filter, by masking appropriate regions of the chirped grating label (regions 905 in FIG. 9) to deactivate them, leaving active label areas between masked regions. As described hereinabove, a spatial bar code printed on a transparent substrate and applied over the chirped grating will provide for the reading of the spatial bar code via spectral detection, as will direct printing of a spatial barcode over the chirped grating. Variations in the angle of incidence used to scan will wavelength-shift the whole label spectral signature, but a time-dependent waveform generated from a scan suitably broad to encompass the shifted spectral label is unchanged. Segments of the chirped grating may be deactivated by any masking means known in the art including ink, paint, or tape. Alternatively, the chirped grating may be stamped with omitted segments rather than applying masking structures, or segments of a chirped grating may be structurally altered so as to be deactivated (by ablation, etching, annealing, or other process for disrupting the lines or grooves of the grating). It is not necessary to employ Littrow condition for spectral label reading. As mentioned earlier, the reading beam and label signal detector may be spatially displaced in which case the grating incidence angle and diffractive scattering angle will differ.

Figure 10:
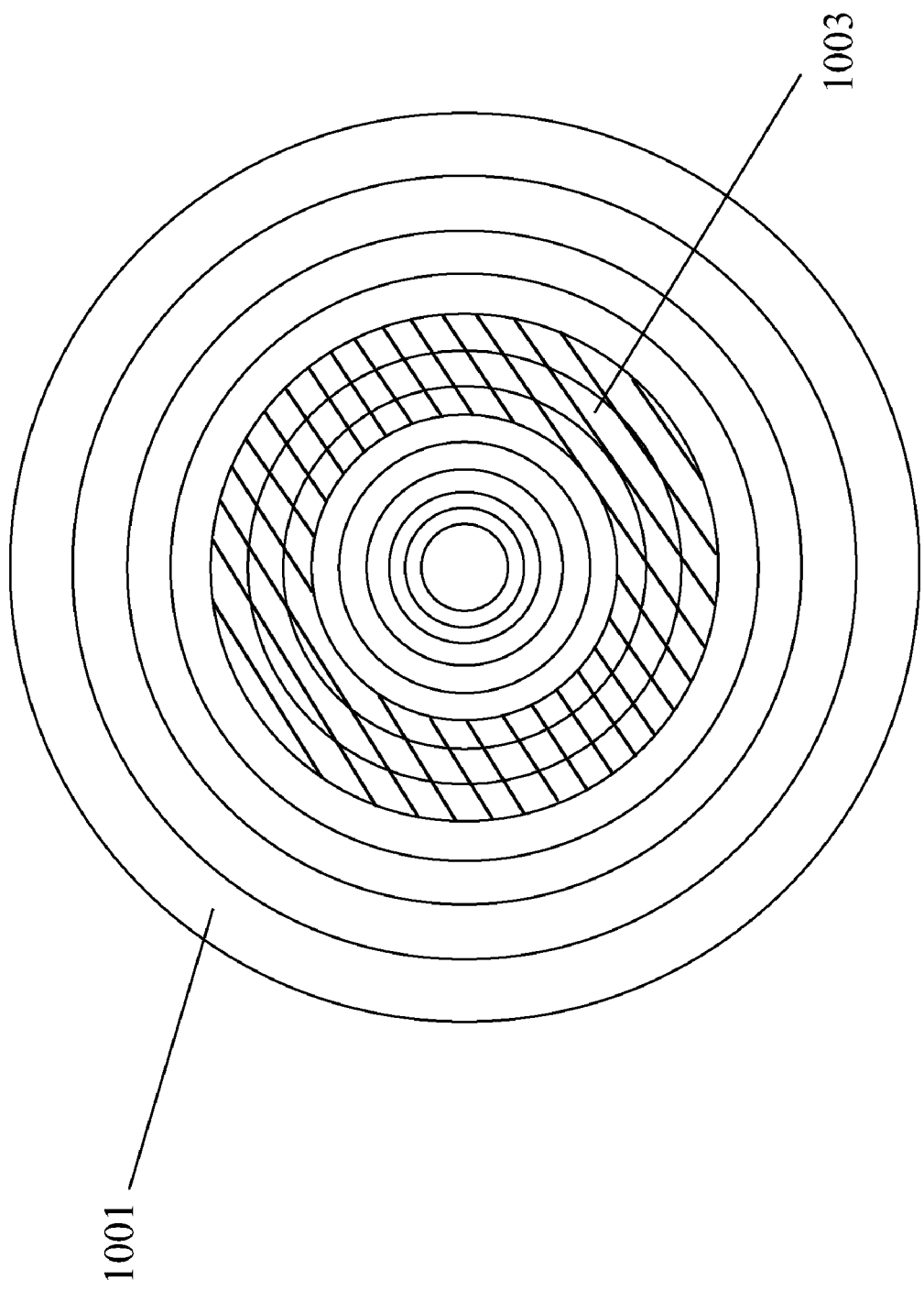
FIG. 10 illustrates schematically a spectrally-encoded label.

Another exemplary spectrally-encoded label is shown schematically in FIG. 10. A circular grating 1001 is stamped, embossed, or otherwise scribed on a suitable substrate including plastic, glass, metal, or other reflective material. The circular grating lines are radially chirped in separation, (i.e., the separation between successive circular grating lines varies monotonically along the radius, either increasing or decreasing). Such a circular chirped grating format may be read from any azimuthal angle about the grating normal. The spectral label is created as in previous approaches by overlaying masking material, but in this case the masks take the form of rings centered about the center of the circular grating. A single masking ring 1003 is shown cross-hatched in FIG. 10. Generally, spectral labels will involve multiple masking rings of varying thickness and inner radius for encoding the label information.

A grating with constant groove or line spacing may be employed for spectral labeling in a manner analogous to a chirped grating if applied to a curved substrate. The curvature of the substrate causes the grating to behaves like a chirped grating, resulting in the wavelength undergoing Littrow back-diffraction to vary with position along the curved grating. A spectral label may be encoded on the curved grating in any of the ways described hereinabove for a chirped grating, and the label may be read in any of the ways set forth hereinabove.

A spectral label employing gratings as spectrally-selective elements may be formed in which multiple gratings are employed, each having a substantially constant groove spacing. As such, each grating forms a distinct areal segment of the label with a corresponding areal spectral signature. Labels may be formed from multiple such areal segments in which all gratings contribute to the label spectral signature. Alternatively, labels may be formed including gratings corresponding to all areal spectral signatures than might be used to contribute to a label spectral signature, and then a fraction of the areal segments may be deactivated (by masking, altering, removing, etc the corresponding grating), with the areal spectral signatures of the remaining gratings contributing to the label spectral signature.

While spectral label reading has been described in terms of remote illumination and emitted light detection, it is also possible to provide local illumination of the spectral label for reading the label remotely. Provided that the label emits the output light to the remote detector so as to preserve the power versus wavelength of the label spectral signature, the remote detector can operate entirely passively (i.e., without sending a reading beam). It is also possible under some circumstances to utilize ambient remote sources to provide needed label illumination. For example, the ambient daylight, either diffuse or direct sunlight, may be employed to provide label illumination and in turn enable a remote detector/reader to operate without providing its own active illumination.

To enable the transmission of more data than can be conveniently accommodated by a single spectral label, the labels can be made active so as to transmit a sequence of spectral labels (or spectral data "words"). Any of the spectrally-encoded labeling types described herein may be made active by including a dynamically controllable mask. An example of such a mask is a liquid crystal light modulator. Many other such spatial modulators or masks are employed in various visual display technologies, and may be readily adapted for implementing dynamically programmable spectral labels. For embodiments based on discrete spectral filters (reflective or transmissive; as in FIGS. 1, and 2) or discrete gratings, spectral filters or gratings representing all potentially utilized areal spectral signatures are included on the label. An active mask overlay, such as a liquid crystal light modulator, is used to control which areal segments are active at any particular time. Altering the active mask overlay alters the label information encoded by the label. For embodiments based on spatially varying spectrally-selective elements (such as chirped and curved gratings and gradient filters and reflectors; FIGS. 5, 6, 9, and 10), the situation is similar. An active overlaying masking layer dynamically changes, allowing a stream of successive spectral "words" to be read from the active label. Alternatively, the spectral signature of individual areal label segments may be actively changed using, for example, spectrally tunable thin film filters known in the art.

Figure 11:
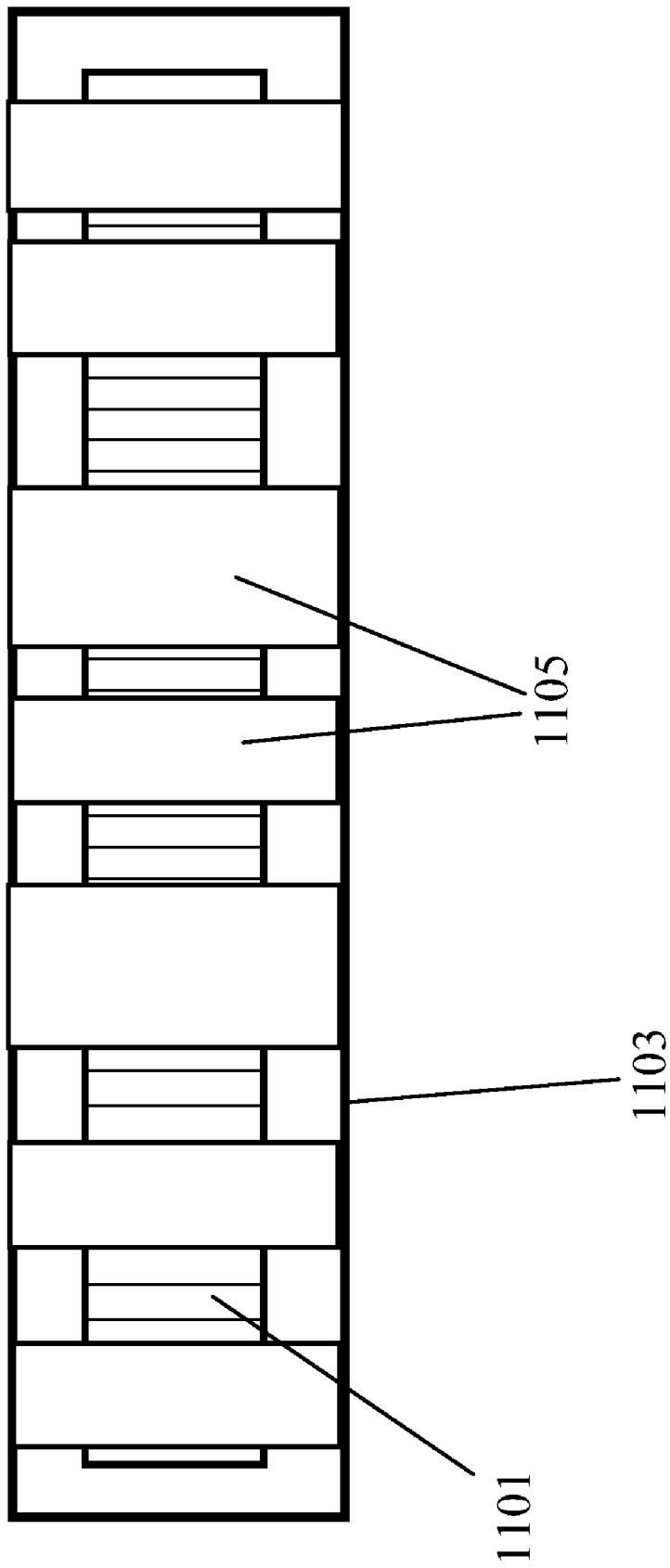
FIG. 11 illustrates schematically a dynamically spectrally-encoded label.

In FIG. 11, element 1101 is the basic spectral label comprising a chirped grating, a grating mounted on a curved surface, a gradient thin film filter, an array of discrete gratings or thin film filters or reflectors spanning all allowed areal spectral signatures, or other mechanism to correlate spectral output response with spatial position. Active mask 1103 serves to mask certain regions 1105 of the spectral label, and to vary the positions of such regions. Such variation may be in response to a local clock signal or in response to temporal signals encoded in the reading beam, or may be triggered in any other suitable manner. For example, the active spectral label may be set to trigger on application of a reading beam and run automatically through a sequence of spectrally-encoded words. In another example, the active spectral label may continuously cycle through a sequence of spectrally-encoded words, with specific words indicating the beginning and/or end of the sequence. The active mask may control transmitted light amplitude, light polarization, or any other property enabling spatial regions of the label to be activated or deactivated. Synchronization of the active spectral label and the reading device may be necessary under some circumstances. In the case of a spectrally-scanned narrowband reading beam, synchronization may be accomplished by sensing the spectral beginning and/or ending of the reading beam spectral sweep. In the case of a broadband reading beam and scanning spectrally-resolved detector, a brief change in the power of the reading optical beam at the beginning or end of each detector spectral scan may be employed for enabling the active label to sense and synchronize with the detector's spectral scans.

It is intended that equivalents of the disclosed exemplary embodiments and methods shall fall within the scope of the present disclosure and/or appended claims. It is intended that the disclosed exemplary embodiments and methods, and equivalents thereof, may be modified while remaining within the scope of the present disclosure and/or appended claims.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: i) it is explicitly stated otherwise, e.g., by use of "either . . . or", "only one of . . . ", or similar language; or ii) two or more of the listed alternatives are mutually exclusive within the particular context, in which case "or" would encompass only those combinations involving non-mutually-exclusive alternatives.

For purposes of the present disclosure or appended claims, the words "include", "including", and so on shall be construed as being open-ended, e.g., "including" shall be construed as "including but not limited to".

What is claimed is:

1. A spectrally-encoded label comprising:
an emitting layer arranged so as to emit output light in response to input light incident thereon; and
a spectrally-selective transmissive optical film, coating, or grating applied to the emitting layer and arranged so that light incident on the emitting layer is first transmitted through the transmissive film, coating, or grating,
wherein:
the transmissive film, coating, or grating exhibits a transmissive label spectral signature that is arranged according to a spectral-encoding scheme so as to represent predetermined label information within the spectral encoding scheme;
the emitting layer of the label is arranged so as to emit output light in response to input light transmitted by the spectrally-selective transmissive optical film, coating, or grating according to the label spectral signature; and
the spectrally-selective transmissive optical film, coating, or grating includes at least two distinct areal segments each having a corresponding distinct areal spectral signature substantially spatially uniform over the corresponding areal segment, and the label spectral signature comprises a combination of the distinct areal spectral signatures that is independent of any spatial arrangement of the areal segments.

2. The label of claim 1 wherein:
the label spectral signature comprises a plurality of spectral bands, each spectral band having a corresponding nominal center wavelength and a corresponding spectral bandwidth; and
the nominal center wavelength or the spectral width of each of the corresponding spectral bands is arranged according to the spectral-encoding scheme to represent the label information.

3. The label of claim 2 wherein nominal center wavelengths and relative spectral widths of the spectral bands of the spectral-encoding scheme are arranged so as to correspond to relative spatial widths of bars or spaces of a spatial barcode.

4. The label of claim 1 wherein the emitting layer is arranged so as to scatter input light transmitted through the spectrally-selective transmissive optical film, coating, or grating, the output light comprising input light scattered from the emitting layer.

5. The label of claim 1 wherein the emitting layer is arranged so as to reflect input light transmitted through the spectrally-selective transmissive optical film, coating, or grating, the output light comprising input light reflected from the emitting layer.

6. The label of claim 1 wherein the emitting layer is arranged so as to retro-reflect input light transmitted through the spectrally-selective transmissive optical film, coating, or grating, the output light comprising input light retro-reflected from the emitting layer.

7. The label of claim 6 wherein the emitting layer comprises a plurality of corner-cube reflectors.

8. The label of claim 1 wherein the emitting layer is arranged so as to absorb input light transmitted through the spectrally-selective transmissive optical film, coating, or grating, the output light comprising resultant fluorescence from the emitting layer.

9. The label of claim 1 wherein the spectrally-selective transmissive optical film, coating, or grating comprises an interference filter.

10. The label of claim 1 wherein the spectrally-selective transmissive optical film, coating, or grating comprises an absorptive filter.

11. The label of claim 1 wherein the spectrally-selective transmissive optical film, coating, or grating comprises a transmission grating.

12. The label of claim 1 wherein the label is arranged so that the output light is emitted according to the label spectral signature in response to simultaneous illumination of the distinct areal segments.

13. A spectrally-encoded label comprising a spectrally-selective reflective optical film, coating, or grating having a reflective label spectral signature, wherein:
the label spectral signature is arranged according to a spectral-encoding scheme so as to represent predetermined label information within the spectral encoding scheme;
the label is arranged so as to reflect a portion of input light as output light selected by the label spectral signature of the reflective optical film, coating, or grating;

the spectrally-selective reflective optical film, coating, or grating includes at least one optical interference filter or at least one diffraction grating arranged so as to reflect a portion of the input light as the output light according to the label spectral signature; and the srectrally-selective reflective optical film, coating, or grating includes at least two distinct areal segments each having a corresponding distinct areal spectral signature substantially spatially uniform over the corresponding areal segment, and the label spectral signature comprises a combination of the distinct areal spectral signatures that is independent of any spatial arrangement of the areal segments.

14. The label of claim 13 wherein:

the label spectral signature comprises a plurality of spectral bands, each spectral band having a corresponding nominal center wavelength and a corresponding spectral bandwidth; and the nominal center wavelength or the spectral width of each of the corresponding spectral bands is arranged according to the spectral-encoding scheme to represent the label information.

15. The label of claim 14 wherein nominal center wavelengths and relative spectral widths of the spectral bands of the spectral-encoding scheme are arranged so as to correspond to relative spatial widths of bars or spaces of a spatial barcode.

16. The label of claim 13 wherein the spectrally-selective reflective optical film, coating, or grating comprises at least one spectrally-selective reflective optical interference filter, and the output light comprises input light reflected from the interference filter.

17. The label of claim 13 wherein the spectrally-selective optical film, coating, or grating comprises at least one diffraction grating.

18. The label of claim 13 wherein the label includes a diffusing layer over the spectrally-selective reflective optical film, coating, or grating.

19. The label of claim 13 wherein the label includes an absorbing layer below the spectrally-selective reflective optical film coating, or grating.

20. The label of claim 13 wherein the label is arranged so that the output light is emitted according to the label spectral signature in response to simultaneous illumination of the distinct areal segments.

21. A spectrally-encoded label comprising:

a spectrally-selective transmissive optical film, coating, or grating having a label spectral signature;

at least one optical detector positioned for detecting input light transmitted through the spectrally-selective transmissive optical film, coating, or grating; and at least one light source for emitting output light in response to detected input light, wherein:

the label spectral signature is arranged according to a spectral-encoding scheme so as to represent predetermined label information within the spectral encoding scheme; and the srectrally-selective transmissive optical film, coating, or grating includes at least two distinct areal segments each having a corresponding distinct areal spectral signature substantially spatially uniform over the corresponding areal segment, and the label spectral signature comprises a combination of the distinct areal spectral signatures that is independent of any spatial arrangement of the areal segments.

22. The label of claim 21 wherein the label comprises a single detector and a single light source.

23. The label of claim 21 wherein the label comprises multiple detectors and a single light source.

24. The label of claim 21 wherein the label comprises multiple detectors and multiple corresponding light sources.

25. The label of claim 21 wherein the light source comprises an LED.

26. The label of claim 21 wherein the label is arranged so that the output light is emitted according to the label spectral signature in response to simultaneous illumination of the distinct areal segments.

27. A spectrally-encoded label system, comprising:

at least one spectrally-encoded label, the label comprising a spectrally-selective optical element having a label spectral signature;

an optical detector sensitive to output light emitted from the label; and a decoder operatively coupled to the detector and arranged to extract predetermined label information from detected output light according to a spectral encoding scheme, wherein:

the label spectral signature is arranged according to the spectral-encoding scheme so as to represent the predetermined label information within the spectral encoding scheme;

the label emits the output light in response to input light selected by the label spectral signature of the optical element; and the srectrally-selective optical element includes at least two distinct areal segments each having a corresponding distinct areal spectral signature substantially spatially uniform over the corresponding areal segment, and the label spectral signature comprises a combination of the distinct areal spectral signatures that is independent of any spatial arrangement of the areal segments, and wherein:

the label comprises a spectrally-selective reflective optical film, coating, or grating comprising at least one optical interference filter or at least one diffraction grating arranged so as to reflect a portion of the input light as the output light according to the label spectral signature;

or the label comprises a spectrally-selective transmissive optical film coating, or grating applied to a broadband emitting layer that is arranged so as to emit the output light in response to input light transmitted by the spectrally-selective transmissive optical film, coating, or grating according to the label spectral signature.

28. The system of claim 27 wherein:

the optical detector comprises a spectrally-resolved detector spanning the label spectral signature and having resolution sufficient to resolve the label spectral signature; and the input light is provided by ambient light.

29. The system of claim 27 further comprising a light source providing the input light for illuminating the label, wherein:

the light source is spectrally sufficiently narrow to resolve the label spectral signature, and is tunable across the label spectral signature; and the optical detector is a single channel detector that is sensitive simultaneously to the entire label spectral signature.

30. The system of claim 27 further comprising a light source providing the input light for illuminating the label, wherein:
the optical detector comprises a spectrally-resolved detector spanning the label spectral signature and having resolution sufficient to resolve the label spectral signature; and
the light source provides input light simultaneously over the entire label spectral signature.

31. The system of claim 27 wherein the optical detector is arranged to generate a temporal waveform in response to detected output light, and the decoder is arranged to extract the label information by analysis of the temporal waveform.

32. The system of claim 27 wherein the decoder is arranged to extract the label information by direct analysis of wavelength-dependence of detected output light.

33. The system of claim 27 wherein:
the label spectral signature comprises a plurality of spectral bands, each spectral band having a corresponding nominal center wavelength and a corresponding spectral bandwidth; and
the nominal center wavelengths and the relative spectral widths of the spectral bands of the spectral-encoding scheme are arranged so as to correspond to relative spatial widths of bars or spaces of a spatial barcode.

34. The system of claim 33 wherein the spatial barcode encoding scheme is a recognized spatial barcode encoding scheme.

35. The system of claim 27 wherein the label is arranged so that the output light is emitted according to the label spectral signature in response to simultaneous illumination of the distinct areal segments.

36. A method comprising:
illuminating at least one spectrally-encoded label, the label comprising a spectrally-selective optical element having a label spectral signature;
receiving output light emitted from the label with an optical detector; and
extracting label information from detected output light according to a spectral encoding scheme using a decoder operatively coupled to the detector,
wherein:
the label spectral signature is arranged according to a spectral-encoding scheme so as to represent predetermined label information within the spectral encoding scheme;
the label emits the output light in response to input light selected by the label spectral signature of the optical element; and
the srectrally-selective optical element includes at least two distinct areal segments each having a corresponding distinct areal spectral signature substantially spatially uniform over the corresponding areal segment, and the label spectral signature comprises a combination of the distinct areal spectral signatures that is independent of any spatial arrangement of the areal segments, and wherein:
the label comprises a spectrally-selective reflective optical film, coating, or grating comprising at least one optical interference filter or at least one diffraction grating arranged so as to reflect a portion of the input light as the output light according to the label spectral signature;
or
the label comprises a spectrally-selective transmissive optical film coating, or grating applied to a broadband emitting layer that is arranged so as to emit the output light in response to input light transmitted by the spectrally-selective transmissive optical film, coating, or grating according to the label spectral signature.

37. The method of claim 36 wherein:
the optical detector comprises a spectrally-resolved detector spanning the label spectral signature and having resolution sufficient to resolve the label spectral signature; and
the label is illuminated by ambient light.

38. The method of claim 36 wherein:
the label is illuminated using a light source that is spectrally sufficiently narrow to resolve the label spectral signature and tunable across the label spectral signature; and
the optical detector is a single channel detector that is sensitive simultaneously to the entire label spectral signature.

39. The method of claim 36 wherein:
the label is illuminated by a light source that provides input light simultaneously over the entire label spectral signature; and
the optical detector comprises a spectrally-resolved detector spanning the label spectral signature and having resolution sufficient to resolve the label spectral signature.

40. The method of claim 36 wherein the optical detector is arranged to generate a temporal waveform in response to detected output light, and the decoder is arranged to extract the label information by analysis of the temporal waveform.

41. The method of claim 36 wherein the decoder is arranged to extract the label information by direct analysis of wavelength-dependence of detected output light.

42. The method of claim 36 wherein the spectral encoding scheme is based on a spatial barcode encoding scheme.

43. The method of claim 42 wherein the spatial barcode encoding scheme is a recognized spatial barcode encoding scheme.

44. The method of claim 36 wherein the label is arranged so that the output light is emitted according to the label spectral signature in response to simultaneous illumination of the distinct areal segments.

* * * * *

UNITED STATES PATENT AND TRADEMARK OFFICE
CERTIFICATE OF CORRECTION

PATENT NO. : 7,341,189 B2 Page 1 of 1
APPLICATION NO. : 11/425369
DATED : March 11, 2008
INVENTOR(S) : Mossberg et al.

It is certified that error appears in the above-identified patent and that said Letters Patent is hereby corrected as shown below:

Column 13, line 60, column 14, line 31, and column 15, line 50, the word "srectrally," each occurrence, should read --spectrally--.

Signed and Sealed this

Twelfth Day of August, 2008

JON W. DUDAS
*Director of the United States Patent and Trademark Office*